Fig. 3.
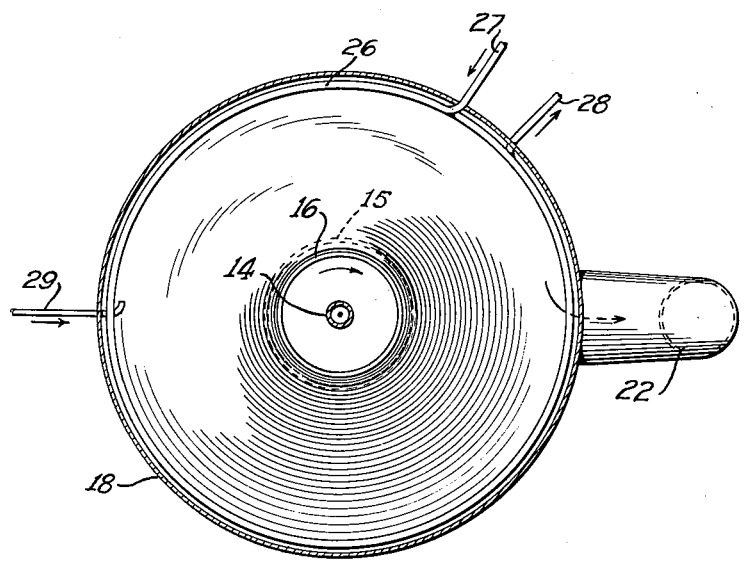
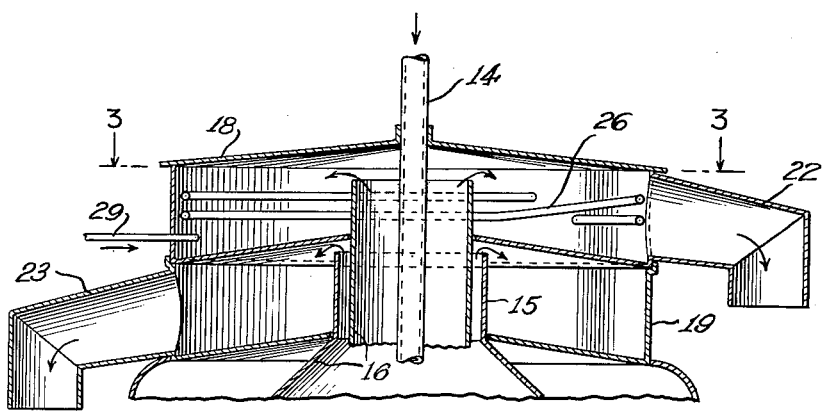
Fig. 2
INVENTORS
Werner R. Kuebler
Peter J. Gregory
Herbert S. Cockeram
BY
J. Augustus Semma
ATTORNEY

United States Patent Office

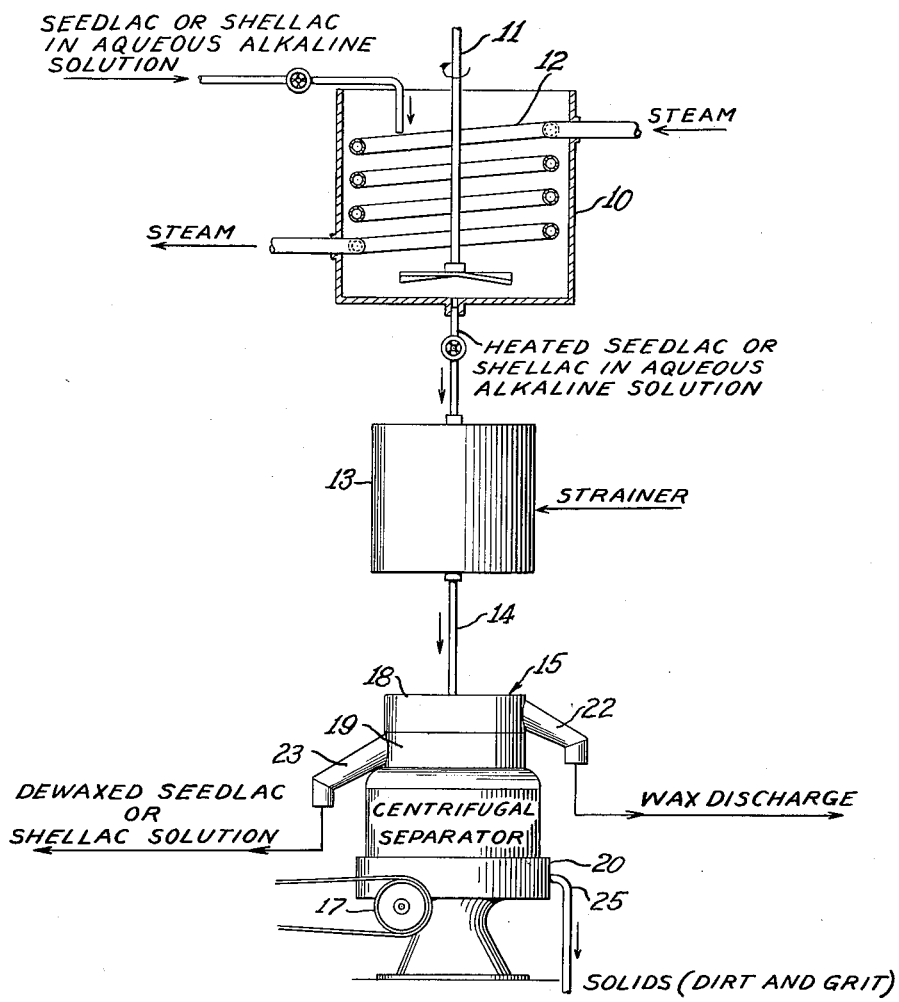

2,985,642
Patented May 23, 1961

2,985,642
ART OF DEWAXING SHELLAC

Werner R. Kuebler, Hohokus, and Peter J. Gregory, Jersey City, N.J., and Herbert S. Cockeram, Rosedale, N.Y., assignors to Gillespie-Rogers-Pyatt Co., Inc., New York, N.Y., a corporation of Delaware Filed Oct. 26, 1956, Ser. No. 618,557

7 Claims. (Cl. 260—107)

The present invention relates to the art of dewaxing seedlac or shellac.

The raw material for manufacturing dewaxed bleached shellac are seedlac and shellac, made from the resinous exudate on trees of a species of insect *Laccifer lacca*. These exudates called "lac resin" are ground and are washed and cleaned to remove such impurities as twigs and insect bodies and to produce thereby the seedlac. The seedlac is a dark red granular substance containing about 90% shellac resin, 5% shellac wax and 5% dirt and other impurities. This seedlac goes through a partial refining process in which it is further washed to remove the shellac dye and further processed to produce so-called flake or orange shellac. This shellac is a yellow to brown flaky substance containing about 92% shellac resin, 5% shellac wax and 3% dirt and other impurities. This shellac is further processed to produce bleached shellac.

Shellac resin is a valuable commercial product and has many uses in industry and in the arts. Shellac wax is also a valuable commercial product and is used in place of and in admixture with other waxes, such as carnauba wax.

In the commercial preparation of ordinary bleached shellac, the shellac wax passes unchanged and undiminished into the finished bleached product, which is known as "white shellac" or "regular bleached shellac." For certain industrial purposes, however, as in the manufacture of certain types of lacquers, a dewaxed bleached shellac is preferred. Such a dewaxed product is known as "refined bleached shellac" or "wax-free bleached shellac." This wax-free product commands a higher price than "regular bleached shellac" which contains wax.

Several methods are known and in use or have been proposed for dewaxing seedlac and shellac. In one of these methods, the removal of the wax takes place by the separating treatment of a solution of seedlac or shellac in alcohol, or in a mixture of alcohol and other organic solvents, such as toluene, xylene, ethers and chlorinated ethers, hydrocarbons and chlorinated hydrocarbons, petroleum and coal-tar naphthas. These solvents have an affinity for or have a complete or partial solvent action upon the wax, so that the separated wax carries a part of this solvent, thereby contaminating the wax.

The organic solvent employed in the wax removal operation described, must be removed from the wax-free bleached shellac produced or it will constitute an undesirable contaminant. This solvent has an adverse effect on the final wax-free bleached shellac. If this solvent is not completely removed from the dewaxed shellac, this shellac will have a tendency to be brittle. Such brittleness in the final product is not desirable for many purposes.

Also, the removal of the organic solvent from the wax-free shellac is difficult and necessitates the employment of solvent recovery equipment which is expensive to install and operate and which occupies substantial floor space. Moreover, some of the organic solvents employed are inflammable and therefore present a fire or explosion hazard.

Commercial methods of dewaxing shellac employ (1) double filtration or (2) partial bleaching combined with settling and filtration. The first method has the disadvantage of being time-consuming and expensive and the further disadvantage of requiring the use of dilute solutions and the handling of large volumes of liquid per unit weight of shellac in all steps beyond the original dissolving step. Wax is a valuable commercial product and the first known method referred to above has the further disadvantage in that the wax is not recovered efficiently from the filter cake produced in the filter press used in said method, even with the steaming of said filter cake.

The second method has the disadvantage of requiring a long settling period, and of not separating the wax in easily recoverable form. Furthermore, the addition of bleaching liquor to a hot solution, which is necessary in this method to promote settling, has a softening effect on the finished product, especially since the solution is maintained hot in the settling tank in the presence of the bleaching liquor for prolonged periods, thereby causing this product to mat or cake easily when filled into bags. Also, hot bleaching for extended periods tends to promote undesirable chemical reactions between the sodium hypochlorite used as the bleaching agent and the shellac molecule, with the formation of short-chain, water-soluble acids and aldehydes. Such acids and aldehydes are not recoverable and therefore are lost, so that an undue waste of shellac resin results. A further disadvantage is the relatively high consumption of bleaching liquor, much of which is not utilized to bleach the colored bodies of the unbleached shellac but is either decomposed by heat, caused to react undesirably with shellac resin molecules, or is consumed by interaction with the finely divided insoluble shellac in suspension. Some bleach may even react with the shellac wax in suspension, this wax having chemical groups susceptible of attack by the bleaching liquor, namely hydroxyl groups.

One object of the present invention is to provide a new and improved process for dewaxing seedlac or shellac, which does not have the drawbacks of the prior art described above.

Another object of the present invention is to provide a new and improved process for dewaxing seedlac or shellac, which is continuous, which does not employ organic solvents and which also serves simultaneously to remove the solid dirt and grit from the seedlac or shellac.

A further object of the present invention is to provide a new and improved centrifugal separator for dewaxing seedlac or shellac.

Centrifuging to dewax the seedlac or shellac would be desirable, but poses very serious problems and has not been used commercially for that reason. The use of organic solvents in connection with such a process would be particularly undesirable for the reasons indicated above.

Also, the centrifuging of the seedlac or shellac, would pose the problem of the clogging of passageways and conduits in the centrifuge by the solidification of the wax.

As a feature of the present invention, a process is provided for centrifuging the seedlac or shellac to dewax it under conditions, which effects efficient separation of the wax and which avoids the use of organic solvents.

It has been found in accordance with the present invention that although an aqueous alkaline solution of seedlac or shellac would be desirable for centrifuging, since it avoids the use of organic solvents, such a solution when subjected to centrifuging has a tendency to foam and this foaming hinders efficient wax separation. Such a solution is similar chemically and physically in its tendency to foam or froth as a soap solution, and its centrifuging is uncertain or even impossible, since the centrifugal forces engendered act upon an incoherent body of froth or foam instead of upon a consistent mass or bulk of liquid.

It has been found surprisingly in accordance with the present invention that foaming can be effectively suppressed by temperature control within a comparatively narrow range, while the solution of seedlac or shellac is passing through the rotating chamber or bowl of the centrifuge. It has also been found in accordance with the present invention, that this temperature range besides suppressing foaming to the point where efficient wax separation is assured, is above the melting point of the wax, resulting thereby in additional advantages. By means of this control temperature range, the wax is caused to separate in molten condition or liquid phase from the seedlac or shellac solution which is in liquid phase, and from the finely divided dirt and gritty matter which is in solid phase by a three-way separation.

It has been found in accordance with the present invention that it is difficult or impossible to remove the wax from a solution of seedlac or shellac by centrifuging, unless the temperature of said solution inside the rotating chamber of the centrifuge is maintained within the temperature range of 180–210° F. At this temperature range, the separation of the wax surprisingly proceeds smoothly, continuously and efficiently under non-foaming and non-frothing conditions. Below this temperature range, excessive foaming or frothing occurs inside the rotating centrifugal chamber, so that separation of wax becomes difficult, and above this temperature range of 180°–210° F., the negative pressure developed inside said rotating chamber, causes the hot liquid to boil or "flash" instantaneously into foam or froth, thereby producing a body of foam or froth from which the wax cannot be separated by centrifugal force.

It has also been found in accordance with the present invention, that unless the wax is in liquid form, it cannot be separated continuously by centrifuging and will clog the passageways and conduits and that since the wax has a melting point of substantially 180° F., the employment of the temperature range described will assure the maintenance of the wax in liquid form during centrifuging.

It has also been found in accordance with the present invention, that it is not sufficient to maintain a constant flow of solution into the centrifuge at the temperaure range indicated, but that this temperature range must be maintained within the rotating centrifuge chamber throughout centrifuging operations, as for example, by judicious application of insulating elements and by means of internal sources of heat, such as steam jets, coils and jackets and/or hot water heating devices suitably located in the centrifuge. Moreover, machine parts which come into contact with the seedlac or shellac solution must be preheated with hot water or steam. Otherwise, wax will deposit as a solid mass on any surface allowed to cool below the melting point of the wax.

Although as a practical matter, the temperature range is 180°–210° F., it is preferred to operate the centrifuging process at a temperature range of 200°–208° F., because within this preferred range, the maximum amount of wax may be separated, while maintaining a maximum flow of solution through the centrifuge.

It has also been found in accordance with the present invention, that another factor which influences the efficiency of dewaxing is the concentration of seedlac or shellac in solution. It has been found that a seedlac or shellac concentration of 12–35% by weight is desirable. Above this concentration range, dewaxing takes place efficiently only when the flow of solution through the centrifuge is drastically reduced. Below this concentration range of 12–35%, excess foaming occurs, even when centrifuging is carried out in the temperature range of 180°–210° F. The concentration range preferred is 18–25% of seedlac or shellac by weight.

It has also been found in accordance with the present invention, that an excessive amount of gross foreign matter in the seedlac or shellac solution being fed into the centrifuge will affect operations adversely, either by plugging parts of the centrifuge or by retarding the speed of separation of the wax. It is, therefore, preferred to pretreat the seedlac or shellac solution by straining through a screen which has 40–80 mesh to the inch. The presence of very finely divided dirt and grit, for example, fine enough to pass through a 40-mesh screen, does not adversely affect the centrifugal separation of the wax to any noticeable extent.

Straining of the solid foreign matter described may be eliminated by using only very clean grades of raw material, such as flake shellacs known as Lemon No. 1, No. 2 or the like, or button lac, but these grades are relatively expensive. It is preferred to use the ordinary grades of seedlac or shellac, which have been employed in the commercial production of dewaxed bleached shellac by other methods, and which are, therefore, economically feasible.

Certain water-soluble electrolytes may be added to the seedlac or shellac solution before centrifuging to increase the efficiency of the dewaxing process. The wax present in seedlac or shellac is emulsified when said seedlac or shellac is dissolved in aqueous hot alkali solutions, and this electrolyte serves to assist in breaking the emulsion. Since it is the function of the centrifugal force applied in the centrifuge to break the emulsion and to cause the wax to separate from both the liquid and solid phases, it is seen how this electrolyte assists in the separation of the wax. However, the centrifuge contemplated in accordance with the present invention is highly effective in breaking the emulsion without the assistance of an electrolyte or water-soluble salt, in addition to the electrolytes or salts functioning as the alkali of the aqueous alkaline solutions employed to dissolve and carry the seedlac or shellac. For that reason, the amount of alkaline substance used is preferably just enough to dissolve the seedlac or shellac. The addition of salts or electrolytes for increasing the dewaxing efficiency adds to the cost of labor and to the chemicals employed, and although such addition might prove effective and desirable when certain types or grades of seedlac or shellac are used, it is preferred in accordance with the present invention to rely on the control of temperature within the non-foaming range described to maintain continuous and efficient dewaxing.

The usual operation of centrifuges in connection with other materials and other arts is a two-phase separation involving the separation of one liquid from another or the separation of a solid from a liquid. As another feature of the present invention, the separation by centrifuging is a three-phase separation, namely the two liquid phases of seedlac or shellac solution and of wax at the temperature of at least 180° F. employed, and the solid phase of dirt and grit, which is in finely divided form and which consists not only of finely divided silica, clay and other mineral matter but also of insect bodies and fragments and plant parts and particles of insoluble shellac in gelatinous form. The seedlac or shellac solution has a specific gravity of about 1.02, the wax has a specific gravity of about 0.9 and the dirt and grit has a specific gravity of 2.0 or more. These differences in specific gravities assure quick, continuous, almost complete, efficient, simultaneous three-phase separation under the conditions of the present invention, and the separation of the wax in liquid phase assures against the clogging of the passageways and conduits by the solidification of the wax. As a result of the process of the present invention, the wax is discharged from the centrifuge continuously in molten form, mixed with a small proportion of seedlac or shellac solution. The liquid seedlac or shellac solution, substantially dewaxed, is also discharged from the centrifuge continuously and at a rate, which is suitable for large scale commercial production. The solid phase consisting essentially of dirt and grit is also discharged continuously mixed with some of the liquid shellac solution.

Inside the rotating chamber or bowl of the centrifuge, which during the separating process is filled at all times with the mixture to be separated, the dirt and grit having the highest density will travel furthest away from the axis of rotation under the action of centrifugal force, the wax having the lowest density will accumulate near the axis of rotation and the seedlac or shellac solution, because its density is intermediate the other two densities of the other components of the mixture will occupy a position in said chamber between the dirt and the wax in relation to the axis of rotation. With a constant feed into the centrifuge of the mixture undergoing separation, the dewaxed seedlac or shellac solution will be discharged continuously from the rotating centrifugal chamber through ports properly located and provided therefor. Similarly, the wax phase accumulating near the axis of rotation may be discharged continuously therefrom through ports properly located and provided therefor. Similarly, the dirt accumulating around the periphery of the rotating centrifugal chamber will be continuously expelled with some of the liquid phase by centrifugal force through ports or nozzles provided therefor. This mixture of dirt and liquid can be reprocessed while the centrifuge is operating and just prior to the time the centrifuge is shut down for cleaning, by discontinuing the feed of seedlac or shellac solution to be dewaxed therein and feeding this mixture of dirt and liquid therein to recover the liquid which may contain wax as well as seedlac or shellac solution. The separated dirt and grit can be collected in and removed from the centrifuge chamber and discarded during normal cleaning of this chamber.

Not all centrifuges are designed to separate three phases. A centrifuge which can be effectively employed for three-phase separation is one sold under the trademark "Nozzle-Matic" Separator, Model AC-VO, made by The De Laval Separator Company and modified as will be described hereinafter. This form of centrifugal separator without the modifications to be described is disclosed in U.S. Patent No. 2,478,992.

In the centrifugal separator of the general type described in the aforesaid patent, centrifugal separation of the three components of the mixture, namely seedlac or shellac solution as a liquid, wax as a liquid and dirt and grit as a solid are accomplished continuously and simultaneously by a rotatable bowl employing a series of conical discs which divide the mixture into thin layers so that centrifugal force can act on these layers most efficiently. Solids are removed by centrifugal force acting on the thin layers in such a way as to cause the particles to slide down these discs and to discharge with a little of the heavy liquid through nozzles into the lowest of three stationary discharge covers. The remainder of the heavy liquid, namely the seedlac or shellac solution discharges into the middle cover, and the light liquid, namely the wax carried by a little of the seedlac or shellac solution discharges from the top cover.

As already indicated, the temperature of the mixture must be maintained in the rotating centrifuge chamber within the range of 180°–210° F. As another feature of the present invention, certain of the other parts of the centrifuge which do not rotate but are static, namely the cover which collects the molten wax and the spout which discharges the separated molten wax from said cover are heated and are subjected to water injection. It is desirable to heat the wax collecting cover internally with a closed steam coil, the condensate therefrom being discharged outside the cover. It has also been found advantageous to inject heated water into the wax collecting cover for the purpose of preventing the separated molten wax from solidifying. Such solidification would render the centrifuging inoperative within a short time.

The molten wax or wax phase flowing from the rotating centrifuge chamber is admixed with a small proportion of the seedlac or shellac solution. This has been found necessary to assure that substantially all of the wax be separated from the seedlac or shellac solution. This admixture possesses the peculiar property of becoming a stable, frothy solid at temperatures above the melting point of the wax. Therefore, unless this stable, frothy solid, which does not flow easily, is dissipated as soon as formed, or unless it is prevented from forming, the wax collecting cover and the wax discharging spout will become filled with this material in this state, and the centrifuge will cease to operate effectively.

It has been found in accordance with the present invention that this stable, frothy, non-flowing solid can be dissipated or prevented from forming by injecting a small stream of heated water at about 160°–200° F. continuously into the wax collecting cover during the centrifuging operation. Although the lower limit of this temperature range is below the melting point of the wax, the amount of hot water injected is so small that it has no appreciable effect on the temperature of the wax, which must be maintained in liquid form (180° or over) to assure its efficient discharge.

The hot water stream on the separated wax causes the frothy solidified wax to be instantaneously and continuously liquified if any such solid is formed and prevents the formation of such a solid. Thus, a steady stream of easily flowable molten wax mixed with a dilute solution of seedlac or shellac issues from the wax spout at a substantially constant rate, this mixture separating upon standing when collected in a suitable heated vessel outside the centrifuge. The wax collected may be subjected to further refining, which is an operation normal to the manufacture of dewaxed bleached shellac and to the commercial recovery of shellac wax.

The dewaxed seedlac or shellac solution which issues from the collecting cover and discharge spout does not exhibit any tendency to solidify, so that said cover and spout do not require internal heating or injection of heated water, as is desirable for the separated wax. However, should the temperature inside the rotating centrifuge chamber exceed the critical temperature range, that is, exceed 210° F., foam instead of liquid issues from this spout, thus giving evidence of the "flashing" of the liquid inside said chamber, as described above. It is therefore, important to maintain the temperature inside the rotating centrifugal chamber or bowl within the limits described.

In carrying out the process of the present invention to produce a dewaxed seedlac or shellac solution, the stock material such as seedlac or any grade of shellac containing wax is dissolved in an aqueous solution of an alkali to produce a solution having a seedlac or shellac concentration of 12–35%, as described above. The alkali may be caustic soda, soda ash, sodium bicarbonate or mixtures thereof, or any alkali which will dissolve shellac, including ammonia water and borax. The resulting mixture must be heated and agitated before being fed to the centrifuge.

The following example illustrates a certain way in which the principle of the invention can be applied, but is not to be construed as limiting the broader aspects of the invention. In conjunction with this specific example, reference is made to the accompanying drawings, in which Fig. 1 is a general diagrammatic view partly in section of a system which may be employed to carry out the process of the present invention;

Fig. 2 is a vertical section somewhat diagrammatic of the upper part of the centrifugal separator showing the wax discharge cover in conjunction with the heating coils and hot water injecting pipe employed in connection with the discharge of the separated wax; and Fig. 3 is a horizontal section somewhat diagrammatic of the upper part of the centrifugal separator taken on line 3—3 of Fig. 2.

In accordance with a specific example for carrying out the process of the present invention, 1640 lbs. of seedlac or shellac, but preferably seedlac are added to a solution of 120 lbs. of soda ash in 6560 lbs. of water at room temperature. The mixture is agitated in a tank or churn 10 equipped with a paddle-type agitator 11 or other suitable agitator, while the temperature is raised from room temperature to about 200° F. and this temperature is maintained for about 45 minutes, although it may be maintained between 30 to 60 minutes. Heating is accomplished by the use of steam coils 12 in the dissolving tank, although open steam pipes in said tank or a steam jacket on said tank may be used instead or in conjunction therewith. The mixture must be agitated during the dissolving period to aid dissolution of the hard granules or flakes of seedlac or shellac. Also, if a carbonate or bicarbonate or a mixture thereof is used as the alkali solvent, the agitation serves to break down the foam resulting from the evolution of carbon dioxide.

The agitation is continued until the seedlac or shellac is substantially all in solution. After this period, which in the specific example is 45 minutes, the shellac wax will be in suspension as finely divided particles, or part or all of it will be in the form of microscopic or submicroscopic molten globules as long as the temperature is above 180° F., the melting point of the shellac wax.

There is more or less insoluble matter contained in seedlac or shellac, and said seedlac and shellac being natural products, may vary in their contents of this insoluble matter, one batch of this seedlac or shellac varying from another in this respect. There is also, more or less, insoluble shellac resin, which after the cooking and dissolving process described, will be in the form more or less of swollen or gelatinous particles.

The sizes of the particles of insoluble matter, whether of mineral origin or derived from shellac resin, ranges from micron size upwards to 10 mesh. There may also be present particles derived from woody matter, twigs and the like and also fragments of the dead bodies of the lac insect.

After the aqueous alkali solution has been formed in the specific example described, the insoluble matter described is removed from the seedlac or shellac solution by straining continuously through a metal wire screen 13 of about 40 meshes to the inch. The discharge from the screen 13 is fed through a pipe 14 continuously from the screen 13 into a centrifugal separator 15 of the three-way type, which is desirably similar to that described in the aforesaid patent. This centrifugal separator 15 is heated before start of operation by hot water or steam to assure that the temperature of the liquid mixture initially and during the entire period of its treatment in the separator is maintained in temperature between 180°–210° F.

In the specific example, the centrifugal separator 15 has a capacity of thirty gallons a minute, and a centrifugal rotatable bowl with a capacity of five gallons, so that the dewaxing of a five gallon quantity of the seedlac or shellac mixture will take the comparatively short time of ten seconds. This high rate of separation is achieved only because of the controlled temperature and other conditions described.

The centrifugal separator 15 has a centrifugal chamber 16 in the form of a bowl, only the upper part being shown in Fig. 2, rotatable about a vertical axis and driven from a motor through a drive 17 and is preferably insulated to reduce heat losses. The feed pipe 14 leads into the interior of the centrifugal bowl 16. The three constituents of the mixture undergoing separation are taken off from the centrifugal bowl 16 at different distances from the axis of rotation of said bowl in accordance with the specific gravities of these components and are collected at three levels in three stationary collecting or discharge covers 18, 19 and 20. The lightest liquid component, namely the wax in molten form mixed with a small amount of the seedlac or shellac solution discharges continuously from a region nearest the axis of rotation of the centrifugal bowl 16 from the upper end of the bowl and into the top cover 18, from which it is discharged continuously through a spout 22. The next heaviest liquid component, namely the dewaxed seedlac or shellac solution is continuously discharged from that region of the centrifugal bowl 16 in intermediate position in relation to its axis of rotation and into the next collecting or discharge cover 19 from which it flows continuously through a spout 23. The heaviest constituent, namely the solids constituting the dirt, grit and other solid impurities and carrying a little of the seedlac or shellac solution to form a sludge therewith, is discharged from the region of the centrifugal bowl 16 furthest from its axis of rotation into the bottom cover 20 and then out through a spout 25.

As indicated above, it is necessary in the wax cover 18 to maintain a temperature high enough but not exceeding 210° F., to prevent the wax from solidifying, so that it will flow freely and at a substantially uniform rate through the discharge spout 22. For that purpose, there is provided as a feature of the present invention, a steam coil 26 having an inlet 27 and a condensate outlet 28 and extending around the inner periphery of the wax cover 18. Since the wax effluent, as it discharges from the centrifugal bowl 16 into the wax cover 18, collects and travels close to the inner periphery of said wax cover in its passage towards the discharge spout 22, the positioning of the steam coil 26 along said inner periphery renders said coil most effective for heating said wax effluent.

As already described, due to the whipping action to which the mixture of wax effluent and the very small amount of seedlac or shellac solution carried with it is subjected before discharge into the wax cover 18 and in said wax cover, as said mixture travels towards the outlet spout 22, this mixture has a tendency to form a frothy gel-like solid mass, even though the temperature of the mixture is maintained within the range prescribed above, and therefore to freeze against flow towards and out of said outlet spout. To avoid this adverse condition, there is injected into the mixture collected on the inner periphery of the wax cover 18 and flowing towards the outlet spout 22, a small stream of hot water at a temperature, high enough, so that it does not lower the temperature of the wax below 180° F. A temperature of 160° F. for the small stream of hot water injected is found sufficient. This stream of hot water is small enough, so that it does not dilute the mixture appreciably, but has the surprising effect of preventing the formation of the frothy solid described and if such a solid should be formed, to break it down instantly into a freely flowable liquid.

The injection of the hot water into the wax cover 18 into contact with the wax effluent is effected through a small pipe 29 extending into said cover. This pipe 29 may have its discharge end turned inwardly to direct the hot water toward the wax effluent travelling along the inner periphery of the wax cover 18 towards the outlet spout 22.

The wax discharged from the spout 22 with the very small amount of seedlac or shellac solution admixed therewith may be further treated in any well known manner to purify the wax, depending on the use for which the wax is intended.

The dewaxed seedlac or shellac used as the raw material for the centrifugal operation before the addition of the water and alkali to form the solution, contains as described between about 90 to 92% shellac resin, about 5% wax and about 3 to 5% dirt and other impurities, according to whether it is the so-called seedlac or the so-called shellac. The dewaxed seedlac or shellac in the aqueous alkaline solvent discharged through the spout 23 of the centrifugal separator 15, will be freed of the bulk of the wax, and would contain less than 0.5% wax. Most of the dirt and other solid impurities would be removed by the centrifuging action from the seedlac or shellac solution and the amount not removed would be in the order of 0.1% to 0.2% of the seedlac or shellac compared with the original 3 to 5%.

The treatment of the dewaxed seedlac or shellac solution obtained from the outlet spout 23 of the centrifugal separator 15, per se, forms no part of the present invention. This solution, for example, may be cooled to 100° F. and treated with a bleaching agent such as sodium hypochlorite liquor, whereupon the liquid is bleached from a dark color to a pale yellow color. Addition of bleaching liquor usually causes the liquor to become slightly cloudy, and since any cloud-producing substances are undesirable in the finished product, the liquid is passed through a filter press, where the last traces of the wax may be removed. The resulting clarified, dewaxed and so-called "polished" liquid is then treated with an acid preferably dilute sulfuric acid in a tank equipped with an agitator paddle, until the pH of the mixture is below about 5. This causes the dawaxed bleached shellac to separate as a mass of curdy grains, which are recovered from the acid liquor by means well known in the art, dried and packed for commercial use.

As a result of the present invention, a continuous separation of wax by centrifuging is effected adaptable to modern continuous large production methods. The invention also provides a method avoiding long settling operations of the prior art, which operations (1) are time-consuming, (2) require equipment occupying large floor space, (3) have adverse effects on the shellac product because of the utilization of high temperatures for prolonged periods, as distinguished from the present invention where the maintenance of high temperature is only for a short period and (4) require contact of the seedlac or shellac in solution with bleaching liquor at elevated temperature during the long settling periods, not only for bleaching purposes but to promote settling, thus effecting chemical breakdown of the shellac molecule. Moreover, the method of the present invention, excessively dilute process solutions are not required, only from one-third to one-half the volume solvent of liquid per unit of shellac weight being required for centrifuging as compared to the dewaxing by filtration alone, followed in the prior art.

In the foregoing description, a distinction has been maintained between "seedlac" and "shellac" as the raw material to be dewaxed. However, both of these compositions are substantially the same, the essential difference being that the so-called "shellac" is in purer form, containing a less amount of dirt, grit and other solid impurities than "seedlac" and a corresponding higher percentage of shellac resin. However, in the following claims, the term "shellac" as the raw material to be dewaxed is intended to cover both seedlac and shellac regardless of the grade.

While the invention has been described with particular reference to a specific embodiment, it is to be understood that it is not to be limited thereto, but is to be construed broadly and restricted solely by the scope of the appended claims.

What is claimed is:

1. The method of dewaxing shellac, which comprises mixing the shellac in an aqueous inorganic alkaline solvent, the concentration of the shellac in the solvent being 12–35% by weight, and subjecting the resulting solution to centrifuging, while maintaining the temperature of the solution between 180° and 210° F.

2. The method of dewaxing shellac as described in claim 1, wherein the solvent is of the class consisting of caustic soda, soda ash, sodium bicarbonate, ammonia, borax and mixtures thereof in water.

3. The method of dewaxing shellac as described in claim 1, wherein the solvent is of the class consisting of caustic soda, soda ash, sodium bicarbonate, ammonia, borax and mixtures thereof in water, the concentration of the shellac in the solution to be centrifuged is 18 to 25% by weight, and the temperature of the solution is maintained during centrifuging between 200° and 208° F.

4. The method of continuously separating shellac containing about 90 to 92% shellac resin, about 5% wax and about 3 to 5% solid impurities, into said three constituents, which comprises mixing the shellac in an aqueous inorganic alkaline solvent to form a mixture of an alkaline aqueous shellac solution, said wax and said solid impurities, the concentration of the shellac in the solvent being 12–35% by weight and subjecting said mixture to a three-way centrifuging operation while maintaining the mixture between 180° and 210° F., to separate the mixture simultaneously into three constituents, namely dewaxed shellac solution in liquid form, wax in liquid form and solid impurities in solid form.

5. The method of dewaxing shellac, which comprises mixing the shellac in an aqueous inorganic alkaline solvent, the concentration of the shellac in the solvent being 12–35% by weight, subjecting the resulting solution to centrifuging in a centrifuging zone while maintaining the temperature of the solution between 180° and 210° F., causing the separated wax to pass from said zone into a collecting chamber on its way to an outlet, maintaining the separated wax in said chamber at a temperature of between 180° and 210° F., and injecting hot water into the separated wax in said collecting chamber to suppress and break down frothy solid formation of the collected wax in said chamber and to cause thereby the separated wax to flow freely in liquid form towards said outlet.

6. The method of dewaxing shellac containing wax and also solid impurities, which comprises mixing the shellac in a solvent of the class consisting of caustic soda, soda ash, sodium bicarbonate, ammonia, borax and mixtures thereof in water with agitation, until the concentration of the shellac in the solution is 12–35%, subjecting the resulting mixture of shellac solution, wax and solid impurities to a three-way centrifuging separating operation in a centrifuging zone, while maintaining the temperature of the solution between 180° and 210° F. to separate the mixture into three components, namely the dewaxed shellac solution in liquid form, the wax in liquid form and the solid impurities in solid form, causing the separated wax to pass from said zone into a collecting chamber on its way to an outlet, heating said chamber to maintain the separated wax collected in said chamber between 180° and 210° F., and injecting hot water into the separated wax in said collecting chamber to suppress and break down frothy solid formations of the collected wax in said chamber and to cause thereby the separated wax to flow freely in liquid form towards said outlet.

7. The method of dewaxing and bleaching shellac containing wax and solid impurities, which comprises mixing the shellac in an aqueous alkaline inorganic solvent, the concentration of the shellac in the solvent being 12–35% by weight, subjecting the resulting mixture of shellac solution, wax and solid impurities to a three-way centrifuging separating operation, while maintaining the temperature of the mixture between 180° and 210° F., to produce three separated components, namely the dewaxed shellac solution in liquid form, wax in liquid form and the solid impurities in solid form, adding a bleaching agent to the dewaxed shellac solution, and adding an acid to the dewaxed bleached shellac solution, to precipitate and recover the dewaxed shellac from the solution.

References Cited in the file of this patent

UNITED STATES PATENTS 1,005,953    Freymuth _____ Oct. 17, 1911

(Other references on following page)

UNITED STATES PATENTS

| | | |
|---|---|---|
| 1,381,705 | Hapgood | June 14, 1921 |
| 1,386,380 | Strauss | Aug. 2, 1921 |
| 1,505,453 | Weir | Aug. 19, 1924 |
| 1,634,244 | Jones | June 28, 1927 |
| 1,644,491 | Rawolle | Oct. 4, 1927 |
| 1,711,315 | Hapgood | Apr. 30, 1929 |
| 1,782,028 | Burch | Nov. 18, 1930 |
| 1,930,479 | Jones | Oct. 17, 1933 |
| 2,106,964 | Wells | Feb. 1, 1938 |
| 2,429,317 | Hampel | Oct. 21, 1947 |
| 2,448,320 | McIntosh | Aug. 31, 1948 |
| 2,478,992 | Wheelright | Aug. 16, 1949 |
| 2,632,003 | Turnbull | Mar. 17, 1953 |